(12) United States Patent
Matsunaga et al.

(10) Patent No.: US 9,314,859 B2
(45) Date of Patent: Apr. 19, 2016

(54) CONTACT DETECTION APPARATUS FOR WIRE ELECTRICAL DISCHARGE MACHINE WITH CAPABILITY TO VARY APPLIED GAP VOLTAGE

(71) Applicant: FANUC CORPORATION, Yamanashi (JP)

(72) Inventors: Tomoaki Matsunaga, Yamanashi (JP); Yushi Takayama, Yamanashi (JP); Akiyoshi Kawahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 437 days.

(21) Appl. No.: 13/780,813

(22) Filed: Feb. 28, 2013

(65) Prior Publication Data
US 2013/0277335 A1     Oct. 24, 2013

(30) Foreign Application Priority Data

Apr. 24, 2012  (JP) .................................. 2012-099095

(51) Int. Cl.
*B23H 1/02*  (2006.01)
*B23H 7/18*  (2006.01)
*G01N 27/02*  (2006.01)
*B23H 7/04*  (2006.01)

(52) U.S. Cl.
CPC .. *B23H 1/02* (2013.01); *B23H 7/18* (2013.01); *B23H 7/04* (2013.01)

(58) Field of Classification Search
CPC ............ B23H 7/16; B23H 7/06; B23H 1/024; B23H 1/02; B23H 7/04; B23H 7/18; B23H 7/20; B23H 2500/20; G01N 27/02; G01N 27/041
See application file for complete search history.

(56) References Cited

U.S. PATENT DOCUMENTS

| | | | |
|---|---|---|---|
| 5,254,826 A | 10/1993 | Kimura et al. | |
| 6,140,600 A | 10/2000 | Kaneko et al. | |
| 6,281,463 B1 * | 8/2001 | Kaneko et al. | 219/69.13 |
| 2002/0060528 A1 | 5/2002 | Murai et al. | |
| 2002/0170885 A1 * | 11/2002 | Krenz | 219/69.11 |
| 2004/0030440 A1 * | 2/2004 | Murai et al. | 700/162 |
| 2005/0115929 A1 * | 6/2005 | Sakurai et al. | 219/69.13 |
| 2009/0261848 A1 * | 10/2009 | Araki et al. | 324/705 |

(Continued)

FOREIGN PATENT DOCUMENTS

| | | |
|---|---|---|
| CN | 201632731 U | 11/2010 |
| EP | 139763 A1 * | 5/1985 |
| JP | 57-211428 A * | 12/1982 |

(Continued)

OTHER PUBLICATIONS

Machine translation of Japan Patent No. 10-76,428-A, May 2015.*

(Continued)

*Primary Examiner* — Geoffrey S Evans
(74) *Attorney, Agent, or Firm* — Hauptman Ham, LLP

(57) ABSTRACT

A contact detection apparatus for a wire electrical discharge machine includes a voltage application unit adapted to apply a detection voltage to detect contact between a wire electrode and a workpiece; a contact determination unit adapted to determine contact or non-contact between the wire electrode and the workpiece based on changes in the detection voltage applied by the voltage application unit; and a voltage value changing unit adapted to change a voltage value of the detection voltage applied by the voltage application unit.

11 Claims, 3 Drawing Sheets

(56) References Cited

U.S. PATENT DOCUMENTS

| | | | |
|---|---|---|---|
| 2010/0090708 A1* | 4/2010 | Kaneko et al. | 324/551 |
| 2012/0152907 A1* | 6/2012 | Chen et al. | 219/69.13 |

FOREIGN PATENT DOCUMENTS

| | | | | |
|---|---|---|---|---|
| JP | 3131428 A | | | 6/1991 |
| JP | 3281150 A | | | 12/1991 |
| JP | 4256521 A | | | 9/1992 |
| JP | 5177439 A | | | 7/1993 |
| JP | 7-266139 A | * | | 10/1995 |
| JP | 10-76428 A | * | | 3/1998 |
| JP | 1076428 A | | | 3/1998 |
| JP | 11226818 A | | | 8/1999 |
| JP | 2002-028789 A | * | | 1/2002 |
| JP | 2002154015 A | | | 5/2002 |
| JP | 2007168056 A | | | 7/2007 |
| JP | 2010-120117 A | * | | 6/2010 |
| JP | 2011131285 A | | | 7/2011 |
| TW | 343847 B | * | | 6/2011 |

OTHER PUBLICATIONS

Machine translation of Japan Patent No. 2002-28,789, May 2015.*
Office Action mailed Oct. 8, 2013, corresponds to Japanese patent application No. 2012-099095.
Office Action dated Dec. 3, 2014, corresponding to Chinese patent application No. 201310142248.7.
Decision to Grant a Patent mailed Apr. 15, 2014 corresponds to Japanese patent application No. 2012-099095.

* cited by examiner

| MATERIAL OF WORKPIECE | VALUE OF APPLIED GAP VOLTAGE |
|---|---|
| MATERIAL 1 | V1 |
| MATERIAL 2 | V2 |
| ⋮ | ⋮ |
| MATERIAL n | Vn |

CONTACT DETECTION APPARATUS FOR WIRE ELECTRICAL DISCHARGE MACHINE WITH CAPABILITY TO VARY APPLIED GAP VOLTAGE

RELATED APPLICATIONS

The present application is based on, and claims priority from, Application Number 2012-099095, filed Apr. 24, 2012, the disclosure of which is hereby incorporated by reference herein in its entirety.

BACKGROUND OF THE INVENTION

1. Field of the Invention

The present invention relates to a wire electrical discharge machine configured to be able to apply a variable voltage to a machining gap between a tool electrode and a workpiece and adapted to detect contact according to materials of the tool electrode and workpiece.

2. Description of the Related Art

In a wire electrical discharge machine, contact between a wire electrode and workpiece is detected as follows: a predetermined voltage pulse is applied to a machining gap between the wire electrode and workpiece during non-machining periods, and any change in a gap voltage generated by the predetermined voltage pulse is detected at a contact location between the wire electrode and workpiece.

For example, Japanese Patent Application Laid-Open No. 3-281150 discloses a wire electrical discharge machine which moves a wire electrode relative to a workpiece, compares the gap voltage between the wire electrode and workpiece with a preset reference voltage, and thereby detects any contact between the wire electrode and workpiece. FIG. 5 is a circuit diagram for illustrating a voltage application unit 3 and contact determination unit 4 in the wire electrical discharge machine using a simplified example of detecting contact between a workpiece and wire electrode. In FIG. 5, reference numeral 11 denotes a direct current voltage source in the voltage application unit 3 and reference numeral 13 denotes a direct current voltage source in the contact determination unit 4. Also, reference numeral 12 denotes a switch and 14 denotes a comparator. During contact detection, the switch 12 is closed and a direct current voltage V1 from the direct current voltage source 11 is applied to a machining gap between a wire electrode 1 and workpiece 2.

Also, Japanese Patent Application Laid-Open No. 2002-154015 discloses a wire electrical discharge machine which repeatedly applies an asymmetric bipolar pulse voltage to a machining gap between a wire electrode and workpiece, and detects any contact between the wire electrode and workpiece based on changes in the asymmetric bipolar pulse voltage.

The detection of contact between the wire electrode and workpiece described above involves applying a voltage of a few volts between the electrodes, monitoring the voltage applied between the electrodes, comparing the voltage with a reference voltage, and determining that the circuit is open if the voltage is higher than the reference voltage. On the other hand, if the voltage is lower than the reference voltage, a numerical controller detects a contact location between the wire electrode and workpiece, regarding that the wire electrode and workpiece are short circuited. Normally a voltage pulse with a small voltage value has to be used for the detection because a voltage pulse with a large voltage value will cause great damage to the workpiece due to electrical discharges during detection of an end face of the workpiece, resulting in flaws.

However, when a small voltage value is used, there is a problem in that the end face of the workpiece cannot be detected well because detection voltage does not change due to high resistance between the wire electrode and workpiece end face if the workpiece is made of a low-conductivity material or if the end face of the workpiece is rough due to rust or electrolysis.

SUMMARY OF THE INVENTION

Thus, in view of the problem with the conventional techniques described above, an object of the present invention is to provide a wire electrical discharge machine configured to be able to vary a voltage value of a voltage pulse and configured to be capable of stable contact detection using an appropriate voltage value for each workpiece.

The present invention provides a contact detection apparatus for a wire electrical discharge machine, the contact detection apparatus comprising: a voltage application unit adapted to apply a detection voltage to detect contact between a wire electrode and a workpiece; a contact determination unit adapted to determine contact or non-contact between the wire electrode and the workpiece based on changes in the detection voltage applied by the voltage application unit; and a voltage value changing unit adapted to change a voltage value of the detection voltage applied by the voltage application unit.

The contact detection apparatus may further comprise: a data table storage unit adapted to store a data table containing voltage values of the detection voltage in association with materials of the workpiece; and a voltage value determination unit adapted to determine the voltage value of the detection voltage based on the data table as well as on the material of the workpiece set as a machining condition.

The contact detection apparatus may further comprise: a data table storage unit adapted to store a data table containing voltage values of the detection voltage in association with materials and sizes of the wire electrode; and a voltage value determination unit adapted to determine the voltage value of the detection voltage based on the data table as well as on the material and size of the wire electrode set as machining conditions.

The voltage value changing unit may change the voltage value by switching over a plurality of power supplies and/or resistance values using a switching unit.

The voltage value changing unit may be a variable-voltage value power supply.

The present invention provides a wire electrical discharge machine configured to be able to vary a voltage value of a voltage pulse and configured to be capable of stable contact detection using an appropriate voltage value for each workpiece.

BRIEF DESCRIPTION OF THE DRAWINGS

The above and other objects and features of the present invention will become more apparent from the following description of the preferred embodiments taken in conjunction with the accompanying drawings, wherein.

DETAILED DESCRIPTION OF THE PREFERRED EMBODIMENT

A system configuration in which positioning is done on a wire electrical discharge machine by application of a contact detection apparatus according to the present invention will be described with reference to FIG. 1.

Figure 1:
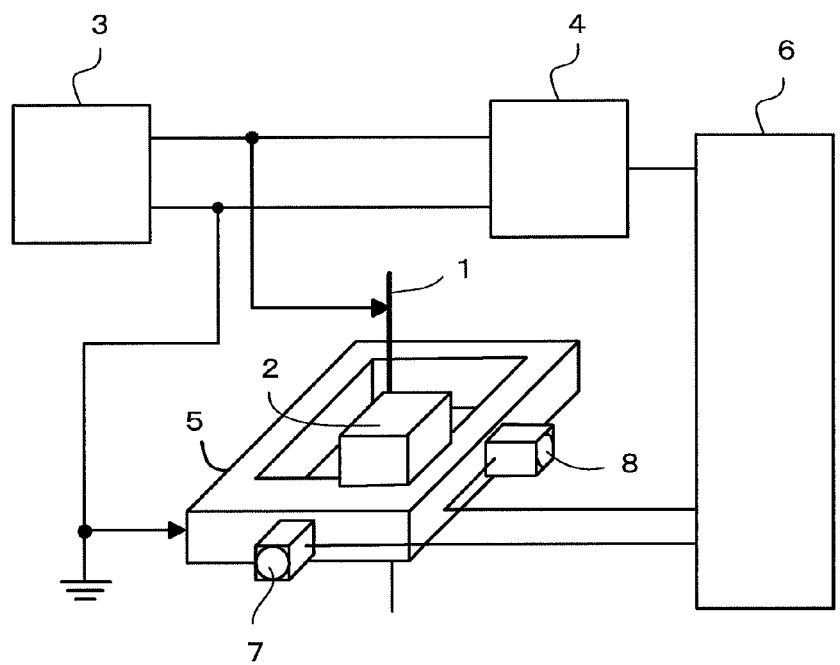
FIG. 1 is a diagram illustrating principal part of a system configuration in which positioning is done on a wire electrical discharge machine by application of a contact detection apparatus according to the present invention.

In FIG. 1, reference numeral 1 denotes a wire electrode, 2 denotes a workpiece, 3 denotes a voltage application unit adapted to apply a voltage to a machining gap between the wire electrode 1 and workpiece 2 to detect contact, 4 denotes a contact determination unit adapted to check for contact by detecting a gap voltage, 5 denotes a movable table electrically conductive to the workpiece 2, and 6 denotes a numerical controller.

Furthermore, in FIG. 1, reference numerals 7 and 8 denote first and second servomotors adapted to move the movable table 5 based on instructions from the numerical controller 6. A machining power supply for electrical discharge machining is connected to a machining gap in an actual wire electrical discharge machine, but the machining power supply for electrical discharge machining can be cut off during contact detection and is not relevant to the contact detection according to the present invention, and thus description thereof will be omitted hereinafter.

When performing positioning using the contact detection apparatus, the numerical controller 6 instructs the voltage application unit 3 to apply a contact detection voltage to the machining gap while at the same time instructing the first and second servomotors 7 and 8 to reduce the relative distance between the wire electrode 1 and workpiece 2 to bring the wire electrode 1 and workpiece 2 into contact with each other.

Eventually, the workpiece 2 fixed to the movable table 5 comes into contact with the wire electrode 1. The contact determination unit 4 verifies contact by comparing the gap voltage with a reference voltage, based on the fact that the voltage applied by the voltage application unit 3 does not appear in the machining gap only when the workpiece 2 and wire electrode 1 are in contact with each other, and outputs a signal indicating contact between the workpiece 2 and wire electrode 1 to the numerical controller 6. In response, the numerical controller 6 instructs the first and second servomotors 7 and 8 to stop the feed, and consequently the positioning operation is completed.

According to the present invention configured to be able to vary the voltage value of the voltage pulse generated by the voltage application unit 3 and applied to the machining gap, the voltage value is set low when a workpiece 2 with a non-rough surface is machined whereas the voltage value is set high when a workpiece 2 with a rough surface or a workpiece 2 of a low-conductivity material is machined. This makes it possible to detect an end face of a workpiece with damage reduced in case where the end face is readily detectable and to detect an end face of a workpiece in a stable manner even in case where the end face is difficult to detect at a low voltage.

Figure 2:
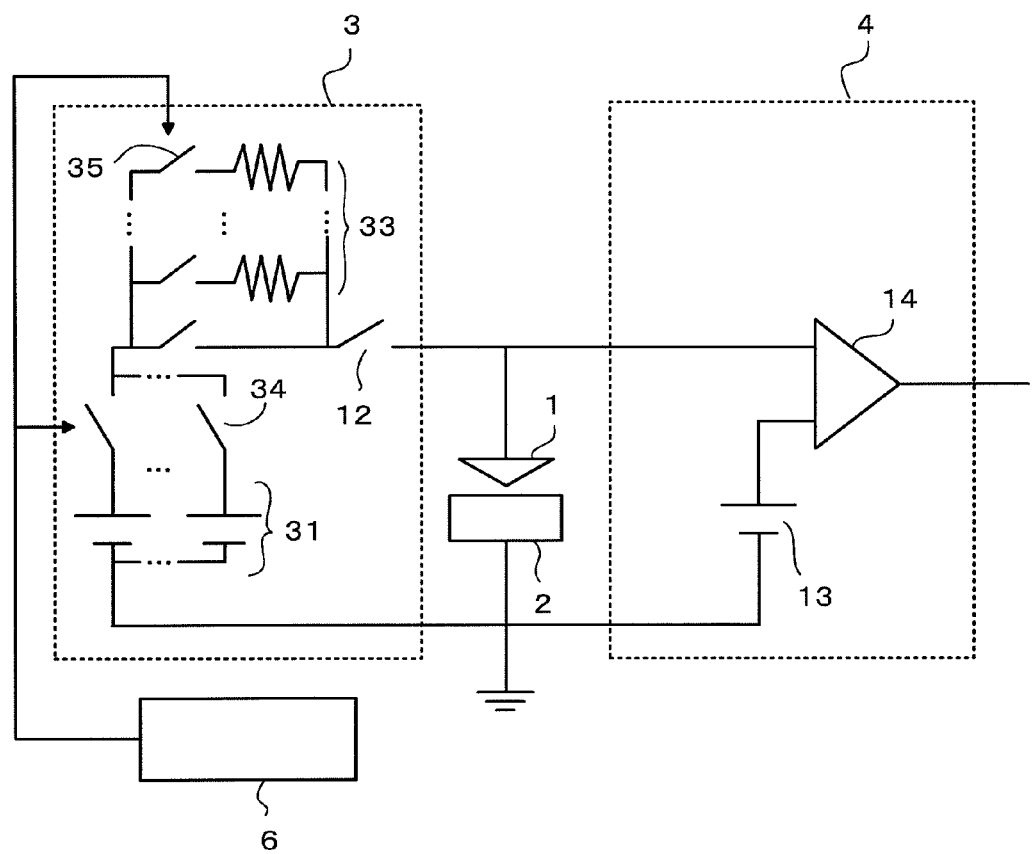
FIG. 2 is a diagram illustrating a first example of internal part of a voltage application unit and contact determination unit in the system configuration of FIG. 1.
Figures 3, 4:
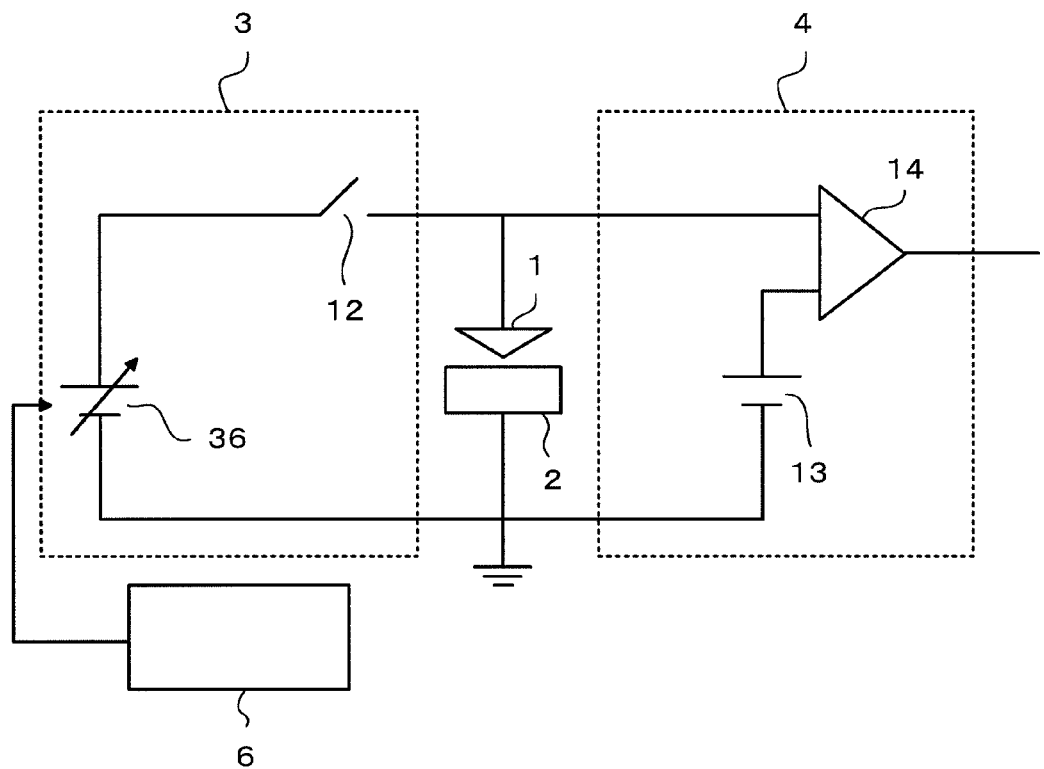
FIG. 3 is a diagram illustrating a second example of internal part of a voltage application unit and contact determination unit in the system configuration of FIG. 1.
FIG. 4 is a diagram illustrating a data table storing appropriate gap voltage values according to materials of workpieces as well as materials and wire diameters of wire electrodes.
Figure 5:
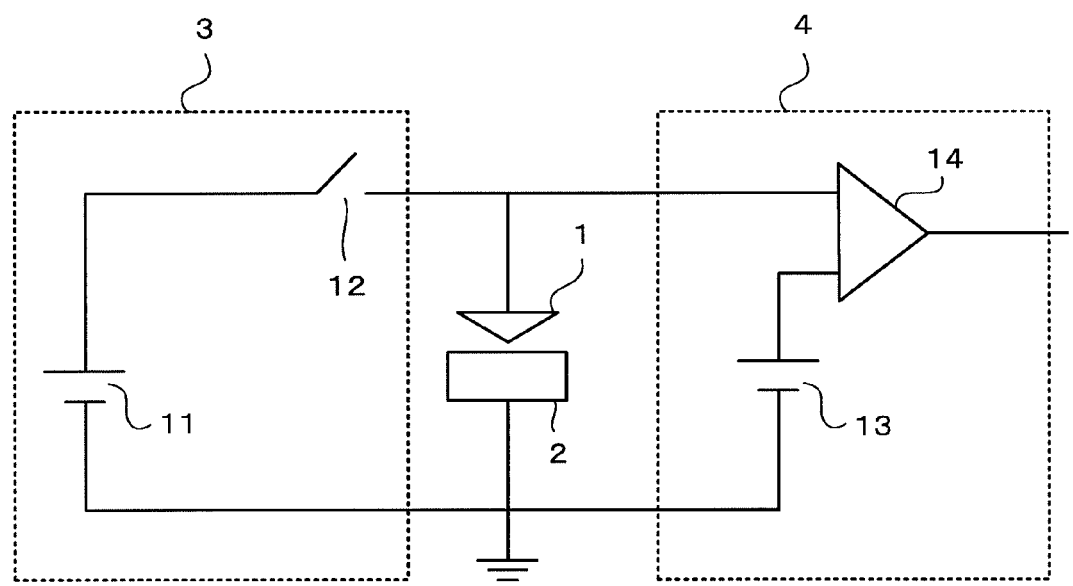
FIG. 5 is a diagram illustrating an example of a contact detection apparatus according to a conventional technique.

Methods for varying the voltage of the voltage pulse generated by the voltage application unit 3 includes a method in which a plurality of voltage sources and resistors are provided and they are selected, from among those voltage sources and resistors, by switches according to an object to be machined, as shown in FIG. 2, and a method in which a voltage source capable of changing a voltage value based on an external signal is provided and the external signal is changed according to an object to be machined to switch over the voltage values, as shown in FIG. 3.

A first example of the voltage application unit 3 and contact determination unit 4 in the system configuration of FIG. 1 will be described with reference to FIG. 2.

In FIG. 2, reference numerals 31 and 13 denote first and second voltage sources; 12, 34, and 35 denote first, second, and third switches; 33 denotes a resistors; and 14 denotes a comparator. During contact detection, the first switch 12 is closed and the direct current voltage V1 is applied to the machining gap between the wire electrode 1 and workpiece 2 by the first direct current voltage sources 31 made up of a plurality of direct current voltage sources. The voltage value applied to the machining gap from the first direct current voltage sources 31 can be switched over by selectively turning on or off the second switches 34. Also, by selectively turning on or off the third switches 35, the value of the resistors 33 can be changed over, thereby switching the value of the voltage applied to the machining gap from the first direct current voltage sources 31. Also, through switching control of the second switches 34 and third switches 35, the voltage value applied to the machining gap between the wire electrode 1 and workpiece 2 can be changed.

Incidentally, in the contact detection apparatus according to the present invention, the second switches 34 correspond to a switching unit adapted to switch over the first direct current voltage sources 31 made up of a plurality of direct current voltage sources while the third switches 35 correspond to a switching unit adapted to switch over a plurality of resistors.

A second example of the voltage application unit 3 and contact determination unit 4 in the system configuration of FIG. 1 will be described with reference to FIG. 3.

In FIG. 3, reference numerals 36 and 13 denote first and second direct current voltage sources; 12 denotes a switch; and 14 denotes a comparator. During contact detection, the switch 12 is closed and a direct current voltage V1 from the variable voltage source 36, which is the first direct current voltage source, is applied to the machining gap between the wire electrode 1 and workpiece 2. The first variable voltage source 36 is a direct current voltage source capable of varying the voltage value based on instructions from the numerical controller 6.

Incidentally, the value of the reference voltage compared with the gap voltage may be fixed or varied according to the value of the applied voltage. If the voltage application unit 3 with a variable voltage capability is applied to the contact detection apparatus, the end face can be detected appropriately according to the material and end-face conditions of the workpiece 2 on the wire electrical discharge machine.

Also, if appropriate gap voltage values are stored in a data table in association with the materials of the workpiece 2, as shown in FIG. 4, or in association with the materials or wire diameters of the wire electrode 1, and the materials of the workpiece 2 and wire electrode 1 are stored in advance in a storage device of the numerical controller 6 of the wire electrical discharge machine, then detection of the end face of the workpiece is made possible by switching to a value of applied gap voltage which is appropriate for the material of the workpiece concerned by referring to the data table. Regarding a data table storing appropriate gap voltage values in association with the materials of the wire electrode 1 and a data table storing appropriate gap voltage values in association with the wire diameters of the wire electrode 1, description will be omitted.

What is claimed is:

1. A contact detection apparatus for a wire electrical discharge machine, said apparatus comprising:
   a voltage application unit configured to apply a detection voltage to detect contact between a wire electrode and a workpiece during non-machining periods;
   a contact determination unit configured to determine contact or non-contact between the wire electrode and the workpiece based on changes in the detection voltage applied by the voltage application unit; and
   a controller configured to change, during the non-machining periods, a voltage value of the detection voltage applied by the voltage application unit according to a property of the workpiece.

2. The contact detection apparatus according to claim 1, wherein
   the voltage application unit comprises voltage sources, resistors, and switching units coupled to the voltage sources and resistors, and
   the controller is configured to change the voltage value by switching over the voltage sources and/or the resistors using the switching units.

3. The contact detection apparatus according to claim 1, wherein the voltage application unit comprises a variable-voltage source.

4. The contact detection apparatus according to claim 1, wherein the property of the workpiece comprises a roughness of a surface of the workpiece to be contacted with the wire electrode.

5. The contact detection apparatus according to claim 1, wherein
   the detection voltage has a first voltage value corresponding to a first roughness of a surface of the workpiece to be contacted with the wire electrode, and a second voltage value corresponding to a second roughness of the surface,
   the first voltage value is higher than the second voltage value, and
   the first roughness is higher than the second roughness.

6. A contact detection apparatus for a wire electrical discharge machine, said apparatus comprising:
   a voltage application unit configured to apply a detection voltage to detect contact between a wire electrode and a workpiece during non-machining periods;
   a contact determination unit configured to determine contact or non-contact between the wire electrode and the workpiece based on changes in the detection voltage applied by the voltage application unit; and
   a controller configured
      to change, during the non-machining periods, a voltage value of the detection voltage applied by the voltage application unit;
      to store a data table containing voltage values of the detection voltage in association with materials of the workpiece; and
      to determine the voltage value of the detection voltage based on the data table as well as on the material of the workpiece set as a machining condition.

7. The contact detection apparatus according to claim 6, wherein the voltage application unit comprises a variable-voltage source.

8. The contact detection apparatus according to claim 6, wherein
   the voltage application unit comprises voltage sources, resistors, and switching units coupled to the voltage sources and resistors, and
   the controller is configured to change the voltage value by switching over the voltage sources and/or the resistors using the switching units.

9. A contact detection apparatus for a wire electrical discharge machine, said apparatus comprising:
   a voltage application unit configured to apply a detection voltage to detect contact between a wire electrode and a workpiece during non-machining periods;
   a contact determination unit configured to determine contact or non-contact between the wire electrode and the workpiece based on changes in the detection voltage applied by the voltage application unit;
   a controller configured
      to change, during the non-machining periods, a voltage value of the detection voltage applied by the voltage application unit;
      to store a data table containing voltage values of the detection voltage in association with materials and sizes of the wire electrode; and
      to determine the voltage value of the detection voltage based on the data table as well as on the material and size of the wire electrode set as machining conditions.

10. The contact detection apparatus according to claim 9, wherein
    the voltage application unit comprises voltage sources, resistors, and switching units coupled to the voltage sources and resistors, and
    the controller is configured to change the voltage value by switching over the voltage sources and/or the resistors using the switching units.

11. The contact detection apparatus according to claim 9, wherein the voltage application unit comprises a variable-voltage source.

* * * * *